United States Patent
Harada et al.

(10) Patent No.: US 9,553,331 B2
(45) Date of Patent: Jan. 24, 2017

(54) SOLID ELECTROLYTE MATERIAL, SOLID ELECTROLYTE, AND BATTERY

(71) Applicant: KABUSHIKI KAISHA TOSHIBA, Minato-ku, Tokyo (JP)

(72) Inventors: Yasuhiro Harada, Yokohama (JP); Norio Takami, Yokohama (JP); Hiroki Inagaki, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 23 days.

(21) Appl. No.: 14/202,729

(22) Filed: Mar. 10, 2014

(65) Prior Publication Data

US 2014/0193718 A1 Jul. 10, 2014

Related U.S. Application Data

(63) Continuation of application No. PCT/JP2012/057339, filed on Mar. 22, 2012.

(51) Int. Cl.
*H01M 10/0562* (2010.01)
*H01B 1/08* (2006.01)
(Continued)

(52) U.S. Cl.
CPC .......... *H01M 10/0562* (2013.01); *C01G 1/02* (2013.01); *C01G 35/006* (2013.01); *C04B 35/495* (2013.01);
(Continued)

(58) Field of Classification Search
CPC ............ H01M 10/0562; H01M 10/0565; H01M 2300/0017; H01M 2300/002
See application file for complete search history.

(56) References Cited

U.S. PATENT DOCUMENTS

| 6,770,187 B1 * | 8/2004 | Putter ............... C25C 1/02 204/252 |
| 2006/0141346 A1 * | 6/2006 | Gordon ............... H01M 6/36 429/112 |
| 2007/0172739 A1 * | 7/2007 | Visco et al. ............... 429/322 |

FOREIGN PATENT DOCUMENTS

| JP | 7-169456 H | 7/1995 |
| JP | 2006-500311 A | 1/2006 |

(Continued)

OTHER PUBLICATIONS

Japanese First office Action dated Nov. 4, 2014 corresponding to JP Application No. 2014-505902, 4 pp.
International Preliminary Report on Patentability dated Oct. 2, 2014 corresponding to PCT/JP2012/057339, 7 pp.
International Search Report (with English translation) dated Jun. 12, 2012 from corresponding PCT/JP2012/057339, 5 pages.

(Continued)

*Primary Examiner* — Jeremiah Smith
(74) *Attorney, Agent, or Firm* — Ohlandt, Greeley, Ruggiero & Perle, L.L.P.

(57) ABSTRACT

According to one embodiment, a solid electrolyte material is an oxide represented by $ABO_3$, wherein an A-site includes Li and vacancies. A cubic root $V^{1/3}$ of a unit cell volume is within a range of 386 pm$\leq V^{1/3} \leq$397 pm. A peak top $v_{top}$ of an absorption peak in an infrared absorption spectrum satisfies Expression (1)

$$v_{top}\ (cm^{-1})=4.7\times V^{1/3}\ (pm)-b \qquad (1),$$

provided that $1220 \leq b \leq 1240$.

6 Claims, 2 Drawing Sheets

(51) Int. Cl.
  $H01M\ 10/0525$ (2010.01)
  $C04B\ 35/495$ (2006.01)
  $C01G\ 35/00$ (2006.01)
  $C01G\ 1/02$ (2006.01)
  $H01M\ 10/0565$ (2010.01)
  $H01M\ 4/131$ (2010.01)
  $H01M\ 10/052$ (2010.01)

(52) U.S. Cl.
  CPC ........... *H01B 1/08* (2013.01); *H01M 10/0525* (2013.01); *C01P 2002/34* (2013.01); *C01P 2002/77* (2013.01); *C01P 2002/82* (2013.01); *C01P 2006/40* (2013.01); *C04B 2235/3201* (2013.01); *C04B 2235/3203* (2013.01); *C04B 2235/3208* (2013.01); *C04B 2235/3213* (2013.01); *C04B 2235/3227* (2013.01); *C04B 2235/3232* (2013.01); *C04B 2235/3251* (2013.01); *C04B 2235/6565* (2013.01); *C04B 2235/761* (2013.01); *C04B 2235/768* (2013.01); *H01M 4/131* (2013.01); *H01M 10/052* (2013.01); *H01M 10/0565* (2013.01); *H01M 2300/002* (2013.01); *H01M 2300/0017* (2013.01); *Y02T 10/7011* (2013.01)

(56) References Cited

FOREIGN PATENT DOCUMENTS

| JP | 2011-204389 A | 10/2011 |
|----|---------------|---------|
| JP | 2011-222415 A | 11/2011 |

OTHER PUBLICATIONS

Written Opinion dated Jun. 12, 2012 from corresponding PCT/JP2012/057339, 6 pages.

Watanabe, et al.; Formation of perovskite solid solutions and lithium-ion conductivity in the compositions, Li2xSr1-2xMIII0.5-xTa0.5+xO3 (M=Cr, Fe, Co, Al, Ga, In, Y); Journal of Power Sources, vol. 68, issue 2, Oct. 1997, pp. 421-426.

Kawakami, et al.; Ionic conduction of lithium for perovskite type compounds, (Li0.05La0.317)1-xSr0.5xNbO3, (li0.1La0.3)1-xSr0.5xNbO3 and (Li0.25La0.25)1-xM0.5xNbO3 (M=Ca and Sr), Solid State Ionics, vol. 110, Issues 3-4, Jul. 2, 1998, pp. 187-192.

Ishikawa, et al.; "Effects of the Framework of Li-ADPESSs on Lithium Ion Conductivity"; Key Engineering Materials, 2000, vol. 181-182, pp. 171-174.

Inaguma, Yoshiyuki; "Perovskite-Type Lithium Ion-Conducting Oxides", Ceramics, 2008, vol. 43, No. 7, pp. 540-546.

\* cited by examiner

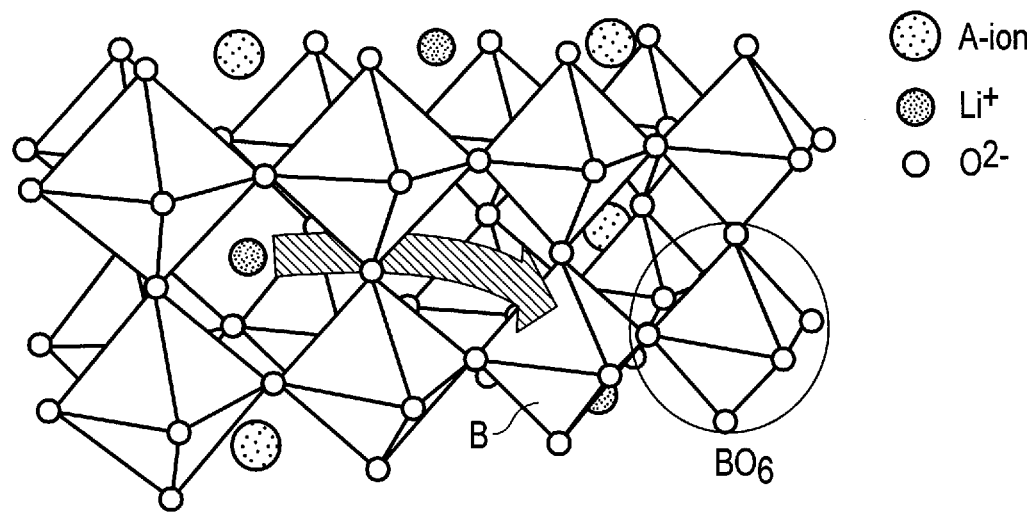
F I G. 1
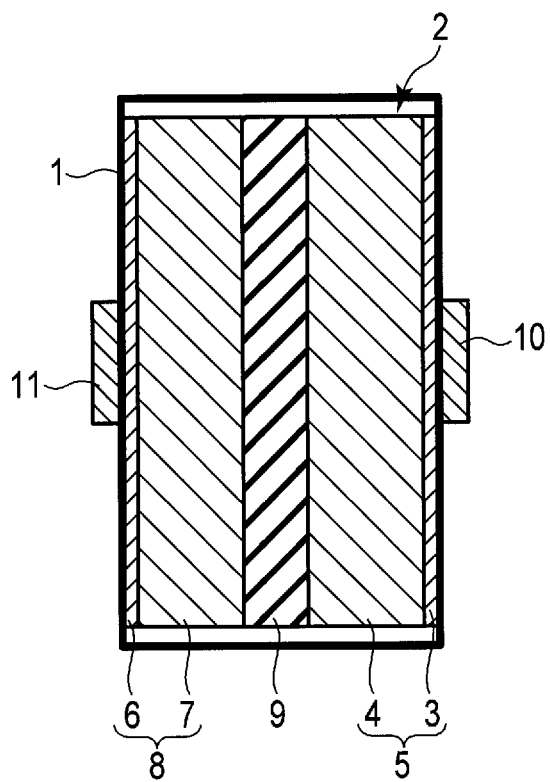
F I G. 2

SOLID ELECTROLYTE MATERIAL, SOLID ELECTROLYTE, AND BATTERY

CROSS-REFERENCE TO RELATED APPLICATIONS

This application is a Continuation Application of PCT Application No. PCT/JP2012/057339, filed Mar. 22, 2012, the entire contents of which are incorporated herein by reference.

FIELD

Embodiments of the present invention described herein generally relate to a solid electrolyte material, a solid electrolyte, and a battery.

BACKGROUND

A lithium ion secondary battery having high energy density has recently attracted much attention as a stationary power source for small electronic devices, hybrid cars, electric vehicles, and power storages. Of such batteries, much anticipation surrounds the lithium ion secondary battery with an inorganic solid electrolyte as a safe battery since it is free from risks such as leakage of an organic electrolytic solution and gas generation. Further, a lithium battery using a solid electrolyte is expected to attain a longer life since it is less subject to side reactions other than a battery reaction as compared to batteries using electrolytic solution. Furthermore, since it is easy to form an all-solid battery using an inorganic solid electrolyte by layering an electrode and an electrolyte layer, the all-solid battery enables to reduce the production cost and also to form a bipolar type battery. Accordingly, a higher energy density is expected as compared to batteries using a liquid-based electrolyte. However, since a material having a high oxidizing power is used for a positive electrode and a material having a high reducing property is used for a negative electrode in a lithium ion battery having high electromotive force, it is necessary for the materials and the solid electrolyte to be stable when they are brought into contact with each other.

Perovskite compounds which have a high lithium ionic conductivity and are easily obtainable by a solid phase reaction in an air atmosphere are attracting attention. A representative example of such a material is $La_{0.67-X}Li_{3X}TiO_3$. One of the compounds having a composition of X=0.11 shows a high lithium ionic conductivity at room temperature Of $1.5 \times 10^{-3}$ S/cm, which is excellent for an oxide-based solid electrolyte. On the other hand, since titanium, which is one of the constituent elements, is easily reduced, there has been a problem that the electrolyte reacts with the negative electrode material having a strong reducing property to exhibit electronic conductivity due to the reduction of tetravalent titanium into trivalent titanium. Since the conductivity of the electrolyte other than the ionic conductivity can entail internal short-circuiting of the battery, the problem is a big issue in terms of its practical application. Therefore, a method of replacing a part of the constituent elements with another element, which has higher reduction-resistant than titanium, has been tried. However, the replacement of the constituent element causes a considerable degradation in the lithium ionic conductivity to about $1/10$ to $1/100$.

BRIEF DESCRIPTION OF DRAWINGS

FIG. 1 is a schematic diagram showing a perovskite type crystal structure of a solid electrolyte material according to one embodiment.

FIG. 2 is a sectional view showing a solid electrolyte secondary battery according to another embodiment.

DETAILED DESCRIPTION

Figure 3:
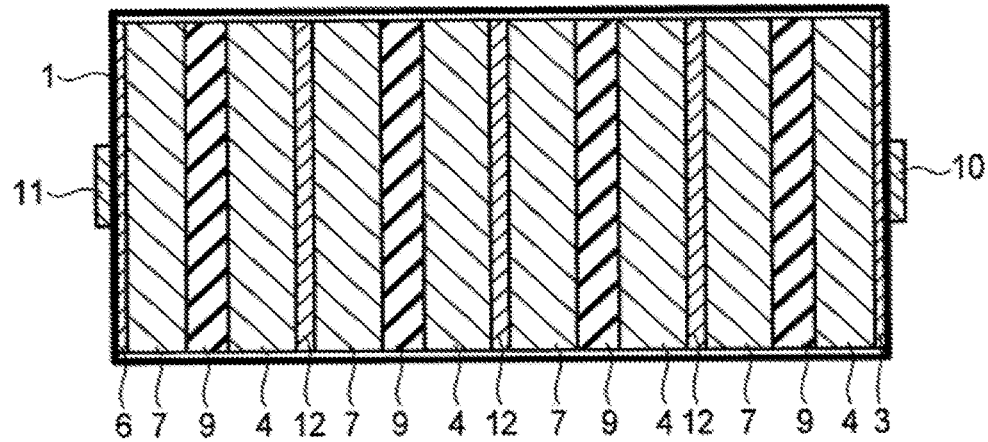
FIG. 3 is a sectional view showing a bipolar battery according to yet another embodiment.

According to one embodiment, a solid electrolyte material is an oxide represented by $ABO_3$, wherein an A-site includes Li and vacancies. A cubic root $V^{1/3}$ of a unit cell volume is within a range of 386 pm $\leq V^{1/3} \leq$ 397 pm. A peak top $v_{top}$ of an absorption peak in an infrared absorption spectrum satisfies Expression (1)

$$v_{top}\,(\mathrm{cm}^{-1}) = 4.7 \times V^{1/3}\,(\mathrm{pm}) - b \tag{1},$$

provided that $1220 \leq b \leq 1240$.

According to the embodiment, a battery includes a positive electrode, a negative electrode, and an electrolyte layer provided between the positive electrode and the negative electrode. The positive electrode contains a positive electrode active material. The negative electrode contains a negative electrode active material. At least one of the positive electrode, the negative electrode, and the electrolyte layer includes the solid electrolyte material.

According to the embodiment, a solid electrolyte includes the solid electrolyte material. Hereinafter, the embodiments will be described with reference to the drawings.

(First Embodiment)

According to the first embodiment, a solid electrolyte material which is an oxide represented by $ABO_3$ will be provided. An A-site comprises Li and vacancies. A cubic root $V^{1/3}$ of a unit cell volume is within the range of 386 pm $\leq V^{1/3} \leq$ 397 pm. A peak top $v_{top}$ of an absorption peak in an infrared absorption spectrum satisfies Expression (1).

$$v_{top}\,(\mathrm{cm}^{-1}) = 4.7 \times V^{1/3}\,(\mathrm{pm}) - b \tag{1},$$

provided that $1220 \leq b \leq 1240$.

Examples of the oxides represented by $ABO_3$ include those having a perovskite crystal structure. Shown in FIG. 1 is a schematic diagram of the perovskite crystal structure. The crystal structure belongs to a cubic system or a similar crystal system which is slightly distorted from the cubic system. A space group which is representative of the crystal structure is Pm3m. As shown in FIG. 1, the perovskite crystal structure has a three-dimensional framework which is formed by sharing vertexes of $BO_6$ octahedrons, and A-site ions occupy 12 coordination sites between the three-dimensional frameworks. In the case where the A-site is not entirely filled with the elements, vacancies (defective structures) are generated to form a conductive path which is the path of lithium ions. It is considered that the lithium ion conductively occurs when the lithium ions migrate to the adjacent vacant A-site through a bottle neck of an oxide ion quadrangle present in a plane of the cubic lattice. In the case where the lithium ions migrate in the crystal lattices by the above-described conductive mechanism, a bond strength between the oxide ion and a cation (cation of mainly B-site) forming the framework greatly influences the lithium ionic conductivity. Therefore, in order to detect the bond strength between the B-cation and the oxide ion, stretching frequency between B—O was examined by using an infrared absorption spectrum to find that there is an optimum condition for the size of the crystal lattice, depending on the constituent elements, and that the lithium ionic conductivity can be deteriorated depending on the frequency of the infrared absorption spectrum even when the crystal lattice size is optimum. As a result, it was confirmed that high lithium ionic conductivity is exhibited when the cubic root $V^{1/3}$ of the unit cell volume is within the range of 386 pm≤$V^{1/3}$≤397 pm and the peak top $\nu_{top}$ of the absorption peak in the infrared absorption spectrum satisfies Expression (1).

$$\nu_{top} (cm^{-1}) = 4.7 \times V^{1/3} (pm) - b \qquad (1),$$

provided that 1220≤b≤1240.

The expression indicates the relationship which enables to maintain the crystal lattice size and the framework flexibility which are considered to be the most optimum for a lithium ion to migrate in the crystal lattice and to maintain the high lithium ionic conductivity of $10^{-3}$ to $10^{-4}$ S/cm at room temperature.

The oxide represented by $ABO_3$ may desirably be titanium oxide containing Ti in the B-site. With such titanium oxide, it is possible to further improve the lithium ionic conductivity at room temperature.

It is desirable that the A-site further contains at least one element selected from the group consisting of La, Sr, Na, Ca, and Nd together with Li and the vacancies and that the B-site contains at least one element selected from the group consisting of Ti, Ta, Cr, Fe, Co, Ga, and Nb. With such a configuration, since an ionic radius of the A-site becomes larger than the B-site, it is possible to make the perovskite structure more stable. Also, the combination of the A-site and the B-site is suitable for forming in the A-site the void path which enables the lithium ionic conductivity. Further, when the B-site contains Ti and at least one element selected from the group consisting of Ta, Cr, Fe, Co, Ga, and Nb, it is possible to substitute the easily-reduced element (Ti) with another element (at least one element selected from the group consisting of Ta, Cr, Fe, Co, Ga, and Nb), thereby enabling to improve the constituent elements in terms of chemical stability.

It is possible to conduct measurement of the cubic root $V^{1/3}$ of the unit cell volume by employing the following method.

A holder portion having a depth of 0.2 mm formed on a glass sample plate is filled with a sample obtained by pulverizing a solid electrolyte material. It is necessary to make sure that the holder portion is sufficiently filled with the sample and that there are no cracks, clearances, and the like which can occur due to insufficient filling of the sample. Next, the sample is flattened by sufficiently pressing another glass plate from outside on the sample. It is also necessary to prevent any deviation above or below a reference surface of the holder caused by a shortage or excess of the filling amount. Next, the glass plate filled with the sample is set in a powder X-ray diffractometry device to detect a diffraction pattern using a Cu—Kα ray.

In the case where an orientation of the sample is high, a peak position can be shifted or an intensity ratio can be changed depending on the filing state of the sample. In such a case, it is desirable to conduct the measurement by filling a capillary with the sample and using a rotatable platform. By conducting the measurement by this method, it is possible to eliminate measurement result differences which can be caused by different operators and thus to enhance reproducibility.

The lattice constant is refined based on the obtained diffraction pattern by employing Rietveld analysis or the like. It is possible to obtain the cubic root $V_{1/3}$ of the unit cell volume from the lattice constant.

The peak top $\nu_{top}$ of an absorption peak in an infrared absorption spectrum is measured by the following method. A sample obtained by pulverizing a solid electrolyte material is mixed with a powder of CsI, and the mixed powder is subjected to compression under reduced pressure to obtain a green compact in the form of pellets. The pellets are measured within the range of 4000 to 224 $cm^{-1}$ by using an infrared absorption spectrometry device. The device may preferably have a resolution of about 4 $cm^{-1}$. For example, a Nicolet Nexus 470 FT-IR Spectrometer can be used. It is possible to detect the peak top $\nu_{top}$ ($cm^{-1}$) of the absorption peak of the sample from the obtained infrared absorption spectrum.

A solid phase reaction can be exemplified as a method for synthesizing the solid electrolyte material. As raw materials for the solid phase reaction, oxides of the constituent elements and various salt compounds such as carbonate and nitrate which generate the constituent elements when heated are usable. The raw materials are mixed at a mixing ratio which maintains a neutrally charged state when an element ratio A:B:O in the composition represented by $ABO_3$ is 1:1:3. It is possible to obtain the solid electrolyte material by sintering the mixture.

In the case where Ti is contained in the B-site, a titanium source is preferably titanium dioxide ($TiO_2$), and different crystal phases such as rutile or anatase may be used alone or in combination of two kinds thereof. As a raw material for lanthanum, niobium, tantalum, neodymium, gallium, iron, cobalt, chrome, iron, or the like, it is preferable to use an oxide thereof. As a raw material for strontium, sodium, calcium, or the like, it is preferable to use a metal salt such as a chloride, a carbonate, and a nitrate thereof. As each of the raw materials, one or two or more kinds selected from among the above-described raw materials may be used.

The raw materials are mixed to obtain a target composition, which is then subjected to calcination. By subjecting the mixture to the calcination at 600° C. to 800° C., a more homogeneous mixed state is attained owing to heat diffusion. A satisfactory mixed state is difficult to attain at a calcination temperature of less than 600° C., while the homogeneous mixed state is difficult to attain due to excessive calcination when the temperature exceeds 800° C. A calcination time is preferably about 5 to 20 hours. The calcined mixture is pulverized again and stirred, followed by sintering at 1000° C. to 1400° C. in an air atmosphere or a gas stream of oxygen gas, nitrogen gas, or the like. In order to obtain the target crystal structure (e.g., perovskite structure) by the sintering, it is preferable to perform re-pulverization after the sintering and then sintering in the same manner as described above a plural times. A method used for the pulverization is not particularly limited. Also, a precursor of the solid electrolyte material may be sintered alone, or, alternatively, it is possible to form an all-solid battery having a small grain boundary of interfaces by solidifying a laminated body of a positive electrode, a negative electrode, and a solid electrolyte layer which contain the precursor, by compression molding or the like and then performing sintering. When the sintering temperature is lower than 1000° C., reactivity is poor, which increases a sintering time and makes it difficult to obtain the target phase, while when the sintering temperature is higher than 1400° C., deviation from the target composition tends to occur due to increased evaporation of alkali metals such as lithium and alkali earth metals. A sum of the sintering time periods is generally 1 to 5 hours which is subject to change depending on the sintering temperature, and it is preferable to perform the sintering at 1300° C. for 2 hours. Further, as the sintering atmosphere, air is suitable from the viewpoints of cost and convenience. However, in the case where it is difficult to form the perovskite structure with the above composition, it is possible to obtain the target crystal structure by performing sintering under a nitrogen atmosphere or a pure oxygen atmosphere, sintering under a high pressure, or the like.

The solid electrolyte material having lithium ionic conductivity is obtainable by the solid phase reaction method, but it is also possible to synthesize the solid electrolyte material by a solution method (sol-gel method). A metal alkoxide containing the target constituent element is used as the raw material, and water-soluble salts are used as raw materials for other additive elements. For example, in the case of a compound containing strontium and lithium in the A-site and titanium and tantalum in the B-site, a titanium isopropoxide is dissolved in ethanol, and then nitrates of lithium, nitrates of strontium or a salt of tantalum is dissolved to attain the target composition, followed by mixing the solutions with stirring, thereby obtaining a gel mixture. The obtained gel mixture is dried by heating at about 90° C. to 120° C. A compound having the target perovskite structure is obtained by sintering a powder of the dried gel mixture at 450° C. to 1000° C. When the sintering temperature is lower than 450° C., reactivity is poor, and the organic components contained in the raw materials are left undecomposed to undesirably remain in the structure. On the other hand, when the sintering temperature exceeds 1000° C., a part of the components is highly possibly evaporated, thus deviating from the target composition. As described above, since it is possible to obtain the target product under low temperature sintering when the sol-gel method is employed, evaporation of the component elements is suppressed, and grain growth is also suppressed. Thus, it is possible to easily obtain the solid electrolyte material having lithium ionic conductivity. Also, by synthesizing the solid electrolyte material by the sol-gel method, formation of a solid battery is facilitated.

It is possible to keep the cubic root $V^{1/3}$ of the unit cell volume and the peak top $v_{top}$ of the absorption peak within the target ranges by adjusting the composition and sintering conditions and performing quenching after the sintering, for example. It is possible to maintain the cubic root $V^{1/3}$ and the peak top $v_{top}$ as described above since the crystallinity of a bulk portion of the solid electrolyte material is improved and a dense domain structure in which the constituent elements are arranged at random is obtained.

According to the solid electrolyte material of the first embodiment, since the cubic root $V^{1/3}$ of the unit cell volume is within the range of 386 pm≤$V^{1/3}$≤397 pm and the peak top $v_{top}$ of the absorption peak in the infrared absorption spectrum satisfies Expression (1), it is possible to provide a solid electrolyte material which is capable of avoiding a reduction in lithium ionic conductivity that can be caused by differences in constituent elements and which has a high lithium ionic conductivity at room temperature.

(Second Embodiment)

According to the second embodiment, it is possible to provide a solid electrolyte and a battery each containing the solid electrolyte material according to the first embodiment. The battery includes a positive electrode containing a positive electrode active material, a negative electrode containing a negative electrode active material, and an electrolyte layer which is provided between the positive electrode and the negative electrode. At least one of the positive electrode, the negative electrode, and the electrolyte layer contains the solid electrolyte material according to the first embodiment. Also, the battery may be provided with a case which houses the positive electrode, the negative electrode, and the electrolyte layer. Examples of the solid electrolyte include the electrolyte layer and further include an electrolyte powder, electrolyte pellets, and so forth without limitation to the layer form.

Hereinafter, the electrolyte layer, the positive electrode, the negative electrode, a nonaqueous electrolyte, and the case will be described in detail.

1) Electrolyte Layer

The electrolyte layer contains the solid electrolyte material according to the first embodiment. The electrolyte layer may be the one which substantially comprises the solid electrolyte material, and the electrolyte layer may contain a nonaqueous electrolyte, a polymer (high molecular weight material) electrolyte, or a room-temperature-molten-salt material in order to further reduce a contact area.

Examples of the nonaqueous electrolyte include a liquid nonaqueous electrolyte which is adjusted by dissolving the electrolyte into an organic solvent, a gel nonaqueous electrolyte which is obtained by compositing a liquid electrolyte and a polymer material, and the like.

The liquid nonaqueous electrolyte is prepared by dissolving the electrolyte at a concentration of 0.5 mol/L or more and 2.5 mol/L or less into the organic solvent.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenic ($LiAsF_6$), lithium trifluoromethasulfonate ($LiCF_3SO_3$), and lithium bistrifluoromethylsulfonylimide [$LiN(CF_3SO_2)_2$] and mixtures thereof. The electrolyte may preferably be highly resistant to oxidation even at a high potential, and $LiPF_6$ is the most preferred. Examples of the organic solvent include a single solvent or a mixed solvent of, for example, cyclic carbonates such as propylene carbonate (PC), ethylene carbonate, (EC), and vinylene carbonate; chain carbonates such as diethyl carbonate (DEC), dimethyl carbonate (DMC), methylethyl carbonate (MEC); cyclic ethers such as tetrahydrofuran (THF), 2-methyltetrahydrofuran (2-MeTHF), dioxolan (DOX); chain ethers such as dimethoxyethane (DME), diethoxy ethane (DEE); γ-butyrolactone (GBL); acetonitrile (AN); sulfolane (SL); and the like.

Examples of the polymer material include polyvinylidene fluoride (PVdF), polyacrylonitrile (PAN), polyethylene oxide (PEO), and the like.

The room-temperature-molten-salt material (molten ionic substance) is a compound which is an organic salt obtained by combining an organic cation and anion and exists in the form of a liquid at an ordinary temperature (15° C. to 25° C.). Examples of the room-temperature-molten-salt material include a room-temperature-molten-salt material which by itself exists in the form of a liquid, a room-temperature-molten-salt material which becomes a liquid when mixed with the electrolyte, a room-temperature-molten-salt material which becomes a liquid when dissolved in an organic solvent, and the like. In general, a melting point of the room-temperature-molten-salt material used for the nonaqueous electrolyte battery is 25° C. or less. Also, the organic cation has a quaternary ammonium framework.

The polymer solid electrolyte is obtained by dissolving the electrolyte into the polymer material, followed by solidification.

2) Negative Electrode

The negative electrode has a negative electrode current collector, a negative electrode material layer (negative electrode active material-containing layer) which is supported at one or both of sides of the negative electrode current collector and contains a negative electrode active material, a conductive agent, and a binder and the like as required. In the negative electrode materiel layer, it is preferable that the solid electrolyte material is distributed in clearances between the dispersed negative electrode active materials, and the binder may be embedded in clearances between the negative electrode active materials. The conductive agent may desirably be added in order to improve a power collecting property and suppressing a contact resistance with the current collector.

The negative electrode active material is not particularly limited and may be a material which is capable of charging and discharging lithium ions and is selected from among lithium metals, carbons, oxides, and sulfides.

A titanium-containing oxide is one example of the oxides. Examples of the titanium-containing oxide include, for example, titanium oxide which does not contain lithium during synthesis of oxide, lithium titanium oxide, and a lithium titanium composite oxide obtained by substituting a part of the constituent elements of lithium titanium oxide with an element of a different species. Examples of the lithium titanium oxide include lithium titanate having a spinel structure (e.g., $Li_{4+x}Ti_5O_{12}$ (0≤x≤3), ramsdellite type lithium titanate (e.g., $Li_{2+y}Ti_3O_7$ (0≤y≤3)), and the like. Examples of the titanium-based oxide include $TiO_2$, a metal composite oxide containing Ti and at least one element selected from the group consisting of V, Sn, Cu, Ni, Co, and Fe. Examples of $TiO_2$ include those having a monoclinic β structure ($TiO_2(B)$), those having an anatase structure, and those having a rutile structure.

Examples of the sulfides include a titanium-based sulfide such as $TiS_2$, molybdenum-base sulfide such as $MoS_2$, iron-based sulfide such as FeS, $FeS_2$, $Li_xFeS_2$ (0≤x≤4), and the like.

As a result of mixing the solid electrolyte material of the first embodiment with particles of the negative electrode active material, the solid electrolyte material may be present on surfaces of the negative electrode active material particles.

Examples of the conductive agent include a carbonaceous material such as acetylene black, carbon black, and graphite.

Examples of the binder include polytetrafluoroethylene (PTFE), polyvinylidene fluoride (PVdF), a fluorine rubber, a styrene butadiene rubber, and the like.

The binder may preferably be contained in the negative electrode material layer within the range of 2 mass % or more and 30 mass % or less. The binding between the negative electrode active material layer and the current collector is enhanced by maintaining the amount of the binder at 2 mass % or more. On the other hand, from the viewpoint of high capacity, the amount of the binder may preferably be 30 mass % or less. The conductive agent may preferably be contained in the negative electrode material layer at a ratio of 30 mass % or less, too.

For the current collector, a material which is electrochemically stable at an absorbing/release potential of lithium of the negative electrode active material is used. The current collector may preferably be made from copper, nickel, stainless steel, or aluminum. A thickness of the current collector may preferably be 0.1 to 20 μm. A current collector having such a thickness provides a negative electrode having a good balance of strength and low weight. In the case of an all-solid battery using the solid electrolyte, it is desirable to form the current collector by vapor deposition or sputtering of the metal.

The negative electrode is produced by preparing a slurry by suspending the negative electrode active material, the solid electrolyte material, the binder, and the conductive agent in a generally-used solvent, forming the negative electrode material layer by coating and drying the slurry on the current collector, and pressing.

Alternatively, the negative electrode active material, the solid electrolyte material, and the conductive agent may be formed into pellets in the production of the negative electrode, and the obtained pellets may be used as the negative electrode material layer.

The negative electrode may contain a nonaqueous electrolyte, a polymer (high molecular weight material) electrolyte, or a room-temperature-molten-salt material in order to reduce a contact area.

3) Positive Electrode

The positive electrode has a current collector and a positive electrode material layer (positive electrode active material-containing layer) which is supported on one or both sides of the current collector and contains a positive electrode active material and a binder.

The positive electrode active materials include oxides, sulfides, and the like. Examples of the positive electrode active material include manganese dioxide ($MnO_2$) which is able to absorb lithium, iron oxide which is able to absorb lithium, copper oxide which is able to absorb lithium, nickel oxide which is able to absorb lithium, lithium manganese composite oxide (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), spinel type lithium manganese nickel composite oxide (e.g., $Li_xMn_{2-y}Ni_yO_4$), lithium phosphorus oxide having an olivine structure (e.g., $Li_xFePO_4$, $Li_xFe_{1-y}Mn_yPO_4$, $Li_xCoPO_4$, etc.), iron sulfate [e.g., $Fe_2(SO_4)_3$], vanadium oxide (e.g., $V_2O_5$), and the like. Each of x and y is within the range of 0 to 1.

Examples of the positive electrode active material which is capable of attaining a high positive electrode voltage include lithium manganese composite oxide ($Li_xMn_2O_4$), lithium nickel composite oxide ($Li_xNiO_2$), lithium cobalt composite oxide ($Li_xCoO_2$), lithium nickel cobalt composite oxide ($LiNi_{1-y}Co_yO_2$), spinel type lithium manganese nickel composite oxide ($Li_xMn_{2-y}Ni_yO_4$), lithium manganese cobalt composite oxide ($Li_xMn_yCo_{1-y}O_2$), lithium iron phosphate ($Li_xFePO_4$), lithium nickel cobalt manganese composite oxide, and the like. Each of x and y is within the range of 0 to 1.

In the case of using the room-temperature-molten-salt, it is preferable to use lithium iron phosphate, $Li_xVPO_4F$, lithium manganese composite oxide, lithium nickel composite oxide, or lithium nickel cobalt composite oxide from the viewpoint of cycle life. With the use of such a positive electrode active material, reactivity between the positive electrode active material and the room-temperature-molten-salt material is suppressed. A primary particle diameter of the positive electrode active material may preferably be 100 nm or more and 1 μm or less. The positive electrode active material having the primary particle diameter of 100 nm or more is industrially easy to handle. The positive electrode active material having the primary particle diameter of 1 μm or less enables smooth solid phase diffusion of the lithium ion.

A specific surface area of the positive electrode active material may preferably be 0.1 $m^2/g$ or more and 10 $m^2/g$ or less. The positive electrode active material having the specific surface area of 0.1 $m^2/g$ or more ensures sufficient lithium absorbing/release sites. The positive electrode active material having a specific surface area of 10 m²/g or less is industrially easy to handle and ensures a good charge/discharge cycle property.

As a result of mixing the solid electrolyte material of the first embodiment with particles of the positive electrode active material, the solid electrolyte material may be present on surfaces of the positive electrode active material particles.

Examples of the binder used for the purpose of binding the positive electrode active material and the current collector to each other and the like include polytetrafluoroethylene (PTFE), polyvinylidene fluoride (PVdF), a fluorine rubber, and the like.

A conductive agent may be contained as required in order to enhance a power collecting property and to suppress contact resistance with the current collector. Examples of the conductive agent include a carbonaceous material such as acetylene black, carbon black, and graphite.

As a content of each of the positive electrode active material and the binder, the positive electrode active material content may preferably be kept within the range of 80 mass % or more and 98 mass % or less, and the binder content may preferably be kept within the range of 2 mass % or more and 20 mass % or less. A satisfactory electrode strength is attained by limiting the binder amount to 2 mass % or more, and a content of an insulator in the electrode is reduced to reduce internal resistance by limiting the binder amount to 20 mass % or less.

In the case of adding the conductive agent, the effect of adding the conductive agent is attended by limiting the amount thereof to 3 mass % or more, and by limiting the amount thereof to 15 mass % or less, it is possible to suppress decomposition of the nonaqueous electrolyte at the positive electrode conductive agent surface when stored at a high temperature.

The positive electrode is produced by preparing a slurry by suspending the positive electrode active material and the solid electrolyte material as well as the binder and the conductive agent which are added when so required to an appropriate solvent, forming the positive electrode material layer by coating and drying the slurry on the positive electrode current collector, and pressing.

Alternatively, the positive electrode active material, the solid electrolyte material, and the binder and the conductive agent as required may be formed into pellets in the production of the positive electrode, and the obtained pellets may be used as the positive electrode material layer.

The positive electrode current collector may preferably be an aluminum foil or an aluminum alloy foil. A thickness of the aluminum foil or the aluminum alloy foil may preferably be 0.1 µm or more and 20 µm or less, more preferably 15 µm or less. A purity of the aluminum foil may preferably be 99 mass % or more. The aluminum alloy may preferably be one containing an element such as magnesium, zinc, or silicon. A content of a transition metal such as iron, copper, nickel, or chrome contained in the aluminum foil or the aluminum alloy foil may preferably be 1 mass % or less. In the case of an all-solid battery using the solid electrolyte, it is desirable to form the current collector by vapor deposition or sputtering of the metal.

The positive electrode may contain a nonaqueous electrolyte, a polymer (high molecular weight material) electrolyte, or a room-temperature-molten-salt material in order to reduce a contact area.

4) Case

As the case, a laminate film case having a thickness of 0.5 mm or less or a metal container having a thickness of 1.0 mm or less is used in the case of using the solid electrolyte material together with the nonaqueous electrolyte. The thickness of the metal container may more preferably be 0.5 mm or less. Further, in the case of the all-solid battery including the solid electrolyte, a molded material may preferably be used as the case.

Examples of the shape of the case include a flat type (thin type), a rectangular type, a cylindrical type, a coil type, a button type, and the like. The case is varied depending on the battery size, and examples thereof include a case for a small battery to be mounted to a mobile electronic appliance and a case for a large battery to be mounted to a two- to four-wheeled vehicle.

As the laminate film, a multilayer film in which a metal layer is disposed between resin films may be used. The metal layer may preferably be an aluminum foil or an aluminum alloy foil for the purpose of reducing the weight. As the resin film, a polymer material such as polypropylene (PP), polyethylene (PE), nylon, or polyethylene terephthalate (PET) is usable. The laminate film may be formed into the shape of the case by performing heat fusion sealing.

The metal container is made from an aluminum or an aluminum alloy. As the aluminum alloy, one containing an element such as magnesium, zinc, or silicon is preferred. A content of a transition metal such as iron, copper, nickel, or chrome in the aluminum or the aluminum alloy may preferably be 100 ppm or less.

Examples of the molded material include a resin molded material made from a cresol novolac type epoxy resin (ECN), a biphenyl type epoxy resin, or a molten silica filler. As other examples, a multifunctional molded resin having a high crosslink density and high glass transition temperature, a biphenyl- or highly functional molded resin-based lead-free halogen-free molded resin, or the like is usable. Alternatively, in the case of a large and high capacity solid battery, a ceramic glass-based molded material may be used considering influences such as heat generation. Molded materials having an excellent insulation property and heat resistance, which are ordinarily used in the field of semiconductors, are usable.

Examples of the battery according to the second embodiment include a solid electrolyte secondary battery and a bipolar battery, for example. One example of the thin solid electrolyte secondary battery according to the embodiment is shown in FIG. 2. Further, an example of the bipolar battery is shown in FIG. 3.

As shown in FIG. 2, the solid electrolyte secondary battery includes a metal container 1 and an electrode group 2 housed in the container 1. The electrode group 2 is a laminated body including a positive electrode 5, a negative electrode 8, and a solid electrolyte layer 9. The positive electrode 5 includes a positive electrode current collector 3 and a positive electrode material layer 4 laminated on the positive electrode current collector 3. The negative electrode 8 includes a negative electrode current collector 6 and a negative electrode material layer 7 laminated on the negative electrode current collector 6. The solid electrolyte layer 9 is disposed between the positive electrode material layer 4 and the negative electrode material layer 7. The positive electrode terminal 10 is fixed to the container 1 via an insulating member (not shown) and is electrically connected to the positive electrode current collector 3. A negative electrode terminal 11 is fixed to the container 1 via an insulating member (not shown) and is electrically connected to the negative electrode current collector 6. The positive electrode and the negative electrode are electrically insulated from the container 1.

As shown in FIG. 3, the bipolar battery is provided with plural bipolar structures in each of which a positive electrode material layer 4 is bonded to one surface of a current collector 12, and a negative electrode material layer 7 is bonded to the other surface of the current collector 12. A solid electrolyte layer 9 is disposed between the positive electrode material layer 4 and the negative electrode material layer 7. In other words, a laminated body is formed of the plural bipolar structures with each of the solid electrolyte layers 9 being disposed between the adjacent bipolar structures. A positive electrode current collector 3 is bonded to the positive electrode material layer 4 positioned at one of outermost layers of the laminated body. A negative electrode current collector 6 is bonded to the negative electrode material layer 7 positioned at the other outermost layer of the laminated body. A positive electrode terminal 10 is fixed to the container 1 via an insulating member (not shown) and is electrically connected to the positive electrode current collector 3. A negative electrode terminal 11 is fixed to the container 1 via an insulating member (not shown) and is electrically connected to the negative electrode current collector 6. The laminated body is electrically insulated from the container 1.

It is possible to use each of the solid electrolyte battery and the bipolar battery for a battery pack. The battery pack includes the battery, members connected to the battery such as a charge/discharge circuit and a housing which houses the battery.

Usages of the battery and the battery pack using the battery is not particularly limited, and examples thereof include vehicles such as a vehicle (including a motor cycle), a bicycle, a bus, and a train.

The cubic root $V^{1/3}$ of the unit cell volume and the peak top $v_{top}$ of the absorption peak in the infrared absorption spectrum are measured by the following method, for example. In the case of the all-solid battery, the electrolyte material is taken out by scraping off the positive electrode material layer and the negative electrode material layer by polishing. The taken-out electrolyte material is pulverized until an average particle diameter reaches about 5 μm. It is possible to detect the average particle diameter by laser diffractometry. Measurements of a powder X-ray diffraction and an infrared absorption spectrum are performed by using the samples. Methods for the measurements of powder X-ray diffraction and infrared absorption spectrum are the same as those of the first embodiment.

According to the batteries of the second embodiment, since at least one of the positive electrode, negative electrode, and electrolyte layer includes the solid electrolyte material of the first embodiment, it is possible to enhance the lithium ionic conductivity and to improve charge/discharge properties such as rate performance. Also, according to the solid electrolyte of the second embodiment, since it contains the solid electrolyte material of the first embodiment, a solid electrolyte excellent in lithium ionic conductivity is realized.

EXAMPLES

Hereinafter, the embodiments will be described in more detail based on examples.

Examples 1 to 4

(Synthesis)

Among the perovskite oxides represented by $Sr_{0.56-x}Na_xLi_{0.33}Ta_{0.56+x}Ti_{0.44-x}O_3$ (0≤x≤0.44), those in which X=0.1, 0.2, 0.3, and 0.44 were synthesized. Vacancies existed in an A-site which contained Li. The one in which X=0.1 is Example 1, the one in which X=0.2 is Example 2, the one in which X=0.3 is Example 3, and the one in which X=0.44 is Example 4. As starting materials, commercially available $Sr(NO_3)_2$, $Na_2CO_3$, $Li_2CO_3$, $Ta_2O_5$, and $TiO_2$ were used. Each of the powders of the raw materials was weighed, and the weighed powders were mixed in a mortar. The mixture was placed in an electric furnace and was preliminarily calcined at 800° C. for 12 hours. The powder of the calcined matter was stirred and molded into a circular plate having a thickness of 1 mm and a diameter of 12 mm by uniaxial molding, followed by sintering at 1350° C. for about an hour. In order to obtain the target material of which a peak top $v_{top}$ of the absorption peak in the infrared absorption spectrum satisfies Expression (1), a heat treatment is performed at 1000° C. for 12 hours, followed by sintering at 1350° C. for an hour. After that, the circular plate was taken out of the furnace to be quenched. By this treatment, a bulk portion was improved in terms of crystallinity, and a dense domain structure in which constituent elements are randomly disrtibuted was obtained. Therefore, a solid electrolyte material of which the peak top $v_{top}$ of the absorption peak in the infrared absorption spectrum satisfies Expression (1) was obtained. Since lithium element evaporation occurred during these treatments, the evaporation amount was estimated beforehand, and Li in the excessive amount was added in order to attain the proper composition.

(Powder X-Ray Diffraction Measurement)

Each of the obtained solid electrolyte materials was subjected to the powder X-ray diffraction measurement as described below. The solid electrolyte material was pulverized until an average particle diameter of about 10 μm was achieved. The obtained sample was filled in a holder portion having a depth of 0.2 mm formed on a glass ample plate. Next, the sample was flattened by sufficiently pressing another glass plate from outside on the sample. After that, the glass plate filled with the sample was set in a powder X-ray diffractometry device to detect a diffraction pattern using a Cu—Kα ray.

From the results of crystal structure analysis based on the Rietveld method, the target perovskite structures were confirmed. Cubic roots $V^{1/3}$ of lattice structure volumes calculated from the lattice constants obtained from the analysis results are shown in Table 1. From the results, it was confirmed that the cubic roots $V^{1/3}$ were within the range of 386 pm≤$V^{1/3}$≤397 pm.

(Infrared Absorption Spectrum Measurement)

Each of the samples pulverized in the same manner as in the powder X-ray diffraction measurement was mixed with a CsI powder and pressed under a reduce pressure to obtain a green compact in the form of pellets. The pellets were subjected to the measurement within the range of 4000 to 224 $cm^{-1}$ by using a Nicolet Nexus 470 FT-IR Spectrometer, which is an infrared absorption spectrometry device. The resolution was about 4 $cm^{-1}$. From each of the detected absorption spectrums, a peak top $v_{top}$ of the absorption peak ($cm^{-1}$) of the corresponding sample was obtained. The peak tops are shown in Table 1.

Figure 4:
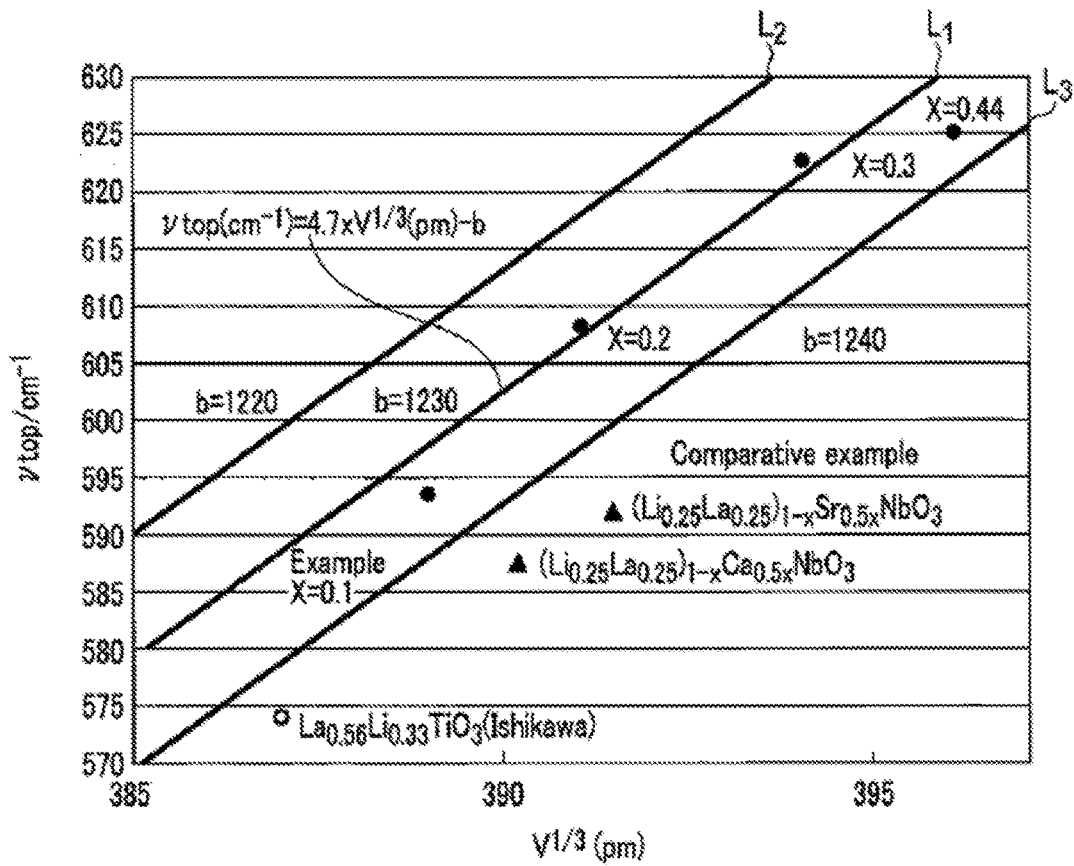
FIG. 4 is a graph showing a relationship between a cube root $V^{1/3}$ of a unit cell volume and a peak top $v_{top}$ of an absorption peak.

FIG. 4 is a graph showing a relationship between the cubic root $V^{1/3}$ of the unit cell volume obtained by the powder X-ray diffraction measurement and the peak top $v_{top}$ ($cm^{-1}$) of the absorption peak obtained by the infrared absorption spectrum measurement. The straight line when b in Expression (1): $v_{top}$ ($cm^{-1}$)=4.7×$V^{1/3}$ (pm)−b is 1230 is indicated by $L_1$; a straight line when b in Expression (1) is 1220 is indicated as $L_2$; and a straight line when b in Expression (1) is 1240 is indicated as $L_3$. In a region enclosed by the straight line $L_2$ and the straight line $L_3$ (including regions on the straight lines), the sample of which the cubic root $V^{1/3}$ of the unit cell volume satisfies 386 pm≤$V^{1/3}$≤397 pm is within the range of the embodiment. It was confirmed from FIG. 4 that the solid electrolyte materials of Examples 1 to 4 satisfy Expression (1) and 386 pm≤$V^{1/3}$≤397 pm.

Comparative Examples 1 and 2

$(Li_{0.25}La_{0.25})_{1-x}Sr_{0.5x}NbO_3$ (X =0.1) and $(Li_{0.25}La_{0.25})_{1-x}Ca_{0.5x}NbO_3$ (X =0.1) were synthesized according to the method described in Y. Kawakami et al., Solid State Ionics, Volume 110, Issues 3-4, 2 July 1998, Pages 187-192. More specifically, the raw material oxides were mixed at the predetermined molar ratio and formed into pellets, and the pellets were calcined at 800° C. for 2 hours, followed by sintering at 1250° C. for 24 hours. Each of the obtained samples was pulverized in the same manner as in the Examples, followed by a powder X-ray diffraction measurement and an infrared absorption spectrum measurement. From the powder X-ray diffraction measurement results, it was confirmed that cubic roots $V^{1/3}$ of unit cell volumes of the solid electrolyte materials of Comparative Examples 1 and 2 were within the range of 386 pm ≤$V^{1/3}$ 397 pm. However, it was confirmed that the peak tops $v_{top}$ (cm$^{-1}$) of absorption peaks detected by the infrared absorption spectrum measurement of the solid electrolyte materials of Comparative Examples 1 and 2 deviated from the range of Expression (1), as is apparent from FIG. 4. Further, FIG. 4 shows a plot (open circle) of $La_{0.56}Li_{0.33}TiO_3$ (Ishikawa) having $V^{1/3}$ and $v_{top}$. $La_{0.56}Li_{0.33}TiO_3$ (Ishikawa) has been described in ISHIKAWA, et al., Effects of the Framework of Li-ADPESSs on Lithium Ion Conductivity, Key Engineering Materials 2000, Volume 181 -182, pages 171 -174. $La_{0.56}Li_{0.33}TiO_3$ represents $(La_{1-x}Sr_{x0.56}Li_{0.33}Ta_{0.56x}Ti_{1-0.56x}O_3$ when x is equal to 0. Clearly, $La_{0.56}Li_{0.33}TiO_3$ (Ishikawa) deviates from the range of Expression (1), as is apparent from FIG. 4.

(Lithium Ionic Conductivity Measurement)

Without pulverizing the solid electrolyte materials obtained by Examples and Comparative Examples, a sample in the form of pellets was obtained from each of the materials. An ion blocking electrode was formed by masking lateral surfaces of the pellet sample and sputtering upper and lower surfaces with gold. Each of the samples was vacuum-dried at 130° C. for 12 hours and then subjected to an AC impedance measurement under an environment of an argon atmosphere and 25° C. A frequency was maintained at 5 Hz to 13 MHz. From a Cole-Cole plot detected from the measurement result, the lithium conductivity $\sigma_b$ of a bulk portion was detected. The results are shown in Table 1.

As is apparent from Table 1, the lithium ionic conductivity at room temperature of the solid electrolyte materials of Examples 1 to 4 is higher than those of Comparative Examples 1 and 2.

Each of the solid electrolyte materials of Examples 1 to 4 and Comparative Examples 1 and 2 was pulverized to obtain a solid electrolyte material power of each of Examples 1 to 4 and Comparative Examples 1 and 2. Also, each of the solid electrolyte materials obtained in Examples 1 to 4 and Comparative Example 1 and 2 by uniaxial compression molding and having a circular plate-like shape having a thickness of 1 mm and a diameter of 12 mm was subjected to thinning by polishing to obtain a solid electrolyte in the form of a layer having a thickness of 0.1 mm. All-solid batteries A and B were produced by using each of the powders and each of the layer-like solid electrolytes. The all-solid batteries A and B of Example 1 were produced by using the solid electrolyte material powder and the layer-like solid electrolyte of Example 1. Likewise, the all-solid batteries A and B of each of Examples 2 to 4 and Comparative Examples 1 and 2 were produced by using each of the solid electrolyte material powders and each of the layer-like solid electrolytes of Examples 2 to 4 and Comparative Examples 1 and 2.

(Production of All-Solid Battery A)

A commercially available lithium cobalt oxide was used as a positive electrode active material. Thirty mass % of the solid electrolyte material powder, 5 mass % of acetylene black as a conductive agent, and 5 mass % of PVdF as a binder were mixed with the lithium cobalt oxide and then dispersed into a N-methylpyrrolidone (NMP) solvent to obtain a paste.

Next, the positive electrode paste was coated on a surface of the layer-like solid electrolyte and dried at 140° C. to form a positive electrode material layer. Next, a metal lithium having a thickness of 1 mm and a diameter of 11 mm was cut out under an environment of an argon atmosphere and attached to a solid electrolyte surface on the opposite side of the positive electrode material layer to form a negative electrode. The obtained electrode group was sealed into a coin cell to obtain an all-solid battery A. A current collector was formed on a positive electrode material layer side by gold sputtering.

(Production of All-Solid Battery B)

A positive electrode material layer was formed on a surface of the solid electrolyte layer in the same manner as in the production of the all-solid battery A. Commercially available spinel type lithium titanate $Li_4Ti_5O_{12}$ (LTO) was used as a negative electrode active material. Thirty mass % of the solid electrolyte material powder, 5 mass % of acetylene black as a conductive agent, and 5 mass % of

TABLE 1

| | Composition | Crystal phase | Bulk conductivity $\sigma_b$/Scm$^{-1}$ | Cubic root $V^{1/3}$ pm of unit cell volume | Infrared absorption spectrum $v_{top}$ (cm$^{-1}$) | Conformity with Expression (1) |
|---|---|---|---|---|---|---|
| Example 1 | 0.10 | Perovskite | 1.2 × 10$^{-3}$ | 389.2 | 593.5 | ○ |
| Example 2 | 0.20 | Perovskite | 1.0 × 10$^{-3}$ | 391.0 | 608.3 | ○ |
| Example 3 | 0.30 | Perovskite | 9.4 × 10$^{-4}$ | 394.1 | 622.8 | ○ |
| Example 4 | 0.44 | Perovskite | 6.8 × 10$^{-4}$ | 395.9 | 625.1 | ○ |
| Comparative Example 1 | $(Li_{0.25}La_{0.25})_{1-x}Sr_{0.5x}NbO_3$ (X = 0.1), | Perovskite | 4.2 × 10$^{-5}$ | 391.5 | 592.1 | X |
| Comparative Example 2 | $(Li_{0.25}La_{0.25})_{1-x}Ca_{0.5x}NbO_3$ (X = 0.1) | Perovskite | 7.8 × 10$^{-6}$ | 390.2 | 587.6 | X |

PVdF as a binder were mixed with $Li_4Ti_5O_{12}$, and the mixture was dispersed into N-methylpyrrolidone (NMP) to obtain a paste. The paste was coated on a surface opposite to the positive electrode and dried at 140° C. to form a negative electrode material layer. Surfaces of the positive electrode material layer and the negative electrode material layer were sputtered with gold to form current collectors, thereby obtaining an all-solid battery B.

(Charge/Discharge Measurement)

The all-solid batteries A and B of each of Examples 1 to 4 and Comparative Examples 1 and 2 were subjected to a charge/discharge test under an environment of 45° C. The charge/discharge test was performed at a potential range of 1.0 to 2.7 V on the all-solid battery B in which lithium titanate was used for the negative electrode and at a potential range of 3.2 to 4.2 V on the all-solid battery A in which metal lithium was used for the negative electrode. A discharge capacity was measured at each of 0.01, 0.03, 0.05, and 0.1 C (discharge rate), and the results are shown in Table 2 in which the discharge capacity at 0.01 C (discharge rate) is set to 100%.

TABLE 2

| | Type of solid electrolyte | Type of negative electrode | 0.01 C discharge capacity maintaining ratio (%) | 0.03 C discharge capacity maintaining ratio (%) | 0.05 C discharge capacity maintaining ratio (%) | 0.1 C discharge capacity maintaining ratio (%) |
|---|---|---|---|---|---|---|
| Example 1 | 0.10 | LTO | 100 | 96.1 | 92.2 | 86.0 |
| | | Metal Li | 100 | 97.9 | 94.8 | 91.3 |
| Example 2 | 0.20 | LTO | 100 | 93.1 | 90.9 | 84.1 |
| | | Metal Li | 100 | 93.6 | 88.1 | 80.9 |
| Example 3 | 0.30 | LTO | 100 | 94.2 | 88.7 | 83.5 |
| | | Metal Li | 100 | 95.4 | 90.5 | 82.4 |
| Example 4 | 0.44 | LTO | 100 | 90.6 | 85.6 | 78.2 |
| | | Metal Li | 100 | 93.3 | 87.2 | 79.0 |
| Comparative Example 1 | $(Li_{0.25}La_{0.25})_{1-x}Sr_{0.5x}NbO_3$ (X = 0.1), | LTO | 100 | 68.0 | 43.5 | 15.2 |
| | | Metal Li | 100 | 70.5 | 52.5 | 20.7 |
| Comparative Example 2 | $(Li_{0.25}La_{0.25})_{1-x}Ca_{0.5x}NbO_3$ (X = 0.1) | LTO | 100 | 45.4 | 5.2 | Impossible to discharge |
| | | Metal Li | 100 | 49.1 | 8.6 | Impossible to discharge |

As is apparent from Table 2, the all-solid batteries A and B of Examples 1 to 4 show a small capacity reduction when the discharge rate is increased, irrespective of the type of the negative electrode active material, and are excellent in rate performance. In contrast, the all-solid batteries A and B of Comparative Examples 1 and 2 show a large capacity reduction when the discharge rate was increased in both of the negative electrode active materials to reveal a poor rate performance.

The positive electrode and the negative electrode were coated on or pressure bonded to the solid electrolyte in the Examples, but the methods are not limitative. It is possible to employ methods which are generally performed in the production of solid electrolytes including a method of using a green compact as a positive electrode, an electrolyte, or a negative electrode, various spin coating methods, and a PVD method may be employed.

According to at least one of the above-described solid electrolyte materials of the embodiments and Examples, since the cubic root $V^{1/3}$ of the unit cell volume is within the range of 386 pm$\leq V^{1/3} \leq$397 pm and the peak top $v_{top}$ of the absorption peak in the infrared absorption spectrum satisfies Expression (1), it is possible to improve the lithium ionic conductivity at room temperature.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid electrolyte material which is an oxide represented by $ABO_3$, wherein an A-site comprises Li and vacancies; a cubic root $V^{1/3}$ of a unit cell volume is within a range of 386 pm$\leq V^{1/3} \leq$397 pm; and a peak top $v_{top}$ of an absorption peak in an infrared absorption spectrum satisfies Expression (1)

$$v_{top} (cm^{-1}) = 4.7 \times V^{1/3} (pm) - b \quad (1),$$

provided that 1220$\leq$b$\leq$1240, and
wherein the oxide is represented by the following formula:

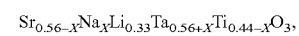

where 0.1$\leq$x$\leq$0.44.

2. The solid electrolyte material according to claim 1, wherein the solid electrolyte material has a perovskite crystal structure.

3. A battery comprising a positive electrode containing a positive electrode active material, a negative electrode containing a negative electrode active material, and an electrolyte layer provided between the positive electrode and the negative electrode, wherein at least one of the positive electrode, the negative electrode, and the electrolyte layer comprises the solid electrolyte material according to claim 1.

4. The battery according to claim 3, wherein the solid electrolyte material according to claim 1 is provided on a surface of at least one of the positive electrode active material and the negative electrode active material.

5. A solid electrolyte comprising the solid electrolyte material according to claim 1.

6. The solid electrolyte material according to claim 1, wherein the cubic root $V^{1/3}$ of the unit cell volume is within a range of 389.2 pm $\leq V^{1/3} \leq$ 397 pm.

* * * * *